United States Patent [19]
Witt

[11] 4,152,846
[45] * May 8, 1979

[54] FLIGHT TRAINING METHOD AND APPARATUS

[76] Inventor: Frank A. Witt, Rt. #4 Hidden Acres, Lexington, S.C. 29072

[*] Notice: The portion of the term of this patent subsequent to May 10, 1994, has been disclaimed.

[21] Appl. No.: 768,851

[22] Filed: Feb. 15, 1977

Related U.S. Application Data

[63] Continuation-in-part of Ser. No. 659,906, Feb. 20, 1976, Pat. No. 4,021,395.

[51] Int. Cl.² ............................................. G09B 09/08
[52] U.S. Cl. ............................... 35/12 B; 2/432; 35/12 G; 350/332
[58] Field of Search .................. 35/12 B, 12 G, 12 N; 40/52 R, 130 L; 2/2, 6, 8, 12, 432; 273/183 B; 340/228 S; 350/160 LC

[56] References Cited

U.S. PATENT DOCUMENTS

| | | | |
|---|---|---|---|
| 3,111,675 | 11/1963 | Mora | 2/432 |
| 3,281,965 | 11/1966 | Irwin | 35/12 B |
| 3,287,828 | 11/1966 | Cumming | 35/12 B |
| 3,342,540 | 9/1967 | Abegg et al. | 2/432 X |
| 3,436,840 | 4/1969 | Noxon | 35/12 B |
| 3,873,804 | 3/1975 | Gordon | 2/8 X |
| 3,942,270 | 3/1976 | Hoyt et al. | 35/12 N |
| 3,989,355 | 11/1976 | Wilmer | 350/160 LC |
| 4,011,002 | 3/1977 | Ebihara et al. | 350/160 LC |
| 4,039,803 | 8/1977 | Harsch | 2/8 X |

OTHER PUBLICATIONS

Dobbins, J. P.; Variable-Transmittance Visor for Helmet Mounted Display; Oct. 24, 1973, pp. 41-50.

*Primary Examiner*—Vance Y. Hum
*Attorney, Agent, or Firm*—Allegretti, Newitt, Witcoff & McAndrews

[57] ABSTRACT

Instrument flight training glasses including a voltage-controlled, liquid crystal viewing lens system operable to a first state of transparency when wearer is viewing the instrument control panel of his aircraft and operable to a second state of opacity to instantaneously occlude viewing when wearer changes his line of vision outside of the aircraft. A lens position sensing system monitors the relative position of the lens system with respect to the aircraft windshield for lens state actuation responsive to a lens position permitting the wearer to view through the windshield along his greatest, upper peripheral line of sight. A manual switching arrangement permits maintenance of lens transparency to provide vertigo simulation capabilities upon flight landing approach whereby wearer changing his line of sight outside of the aircraft to occlude his viewing, and thereafter manually switching the lens to its transparent state enters a condition of vertigo.

18 Claims, 10 Drawing Figures

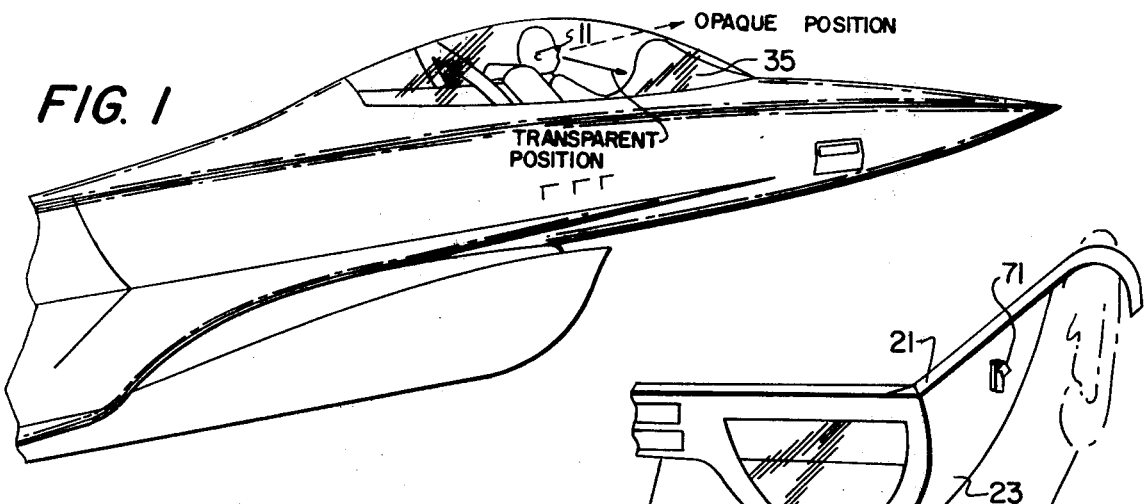
FIG. 1
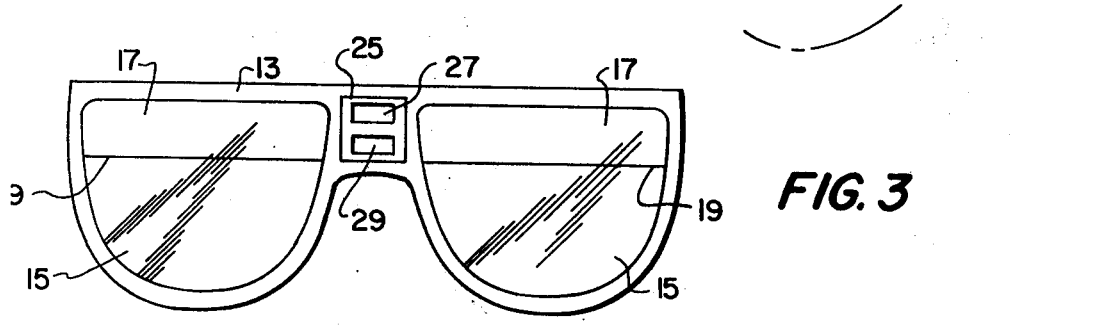
FIG. 2
FIG. 3
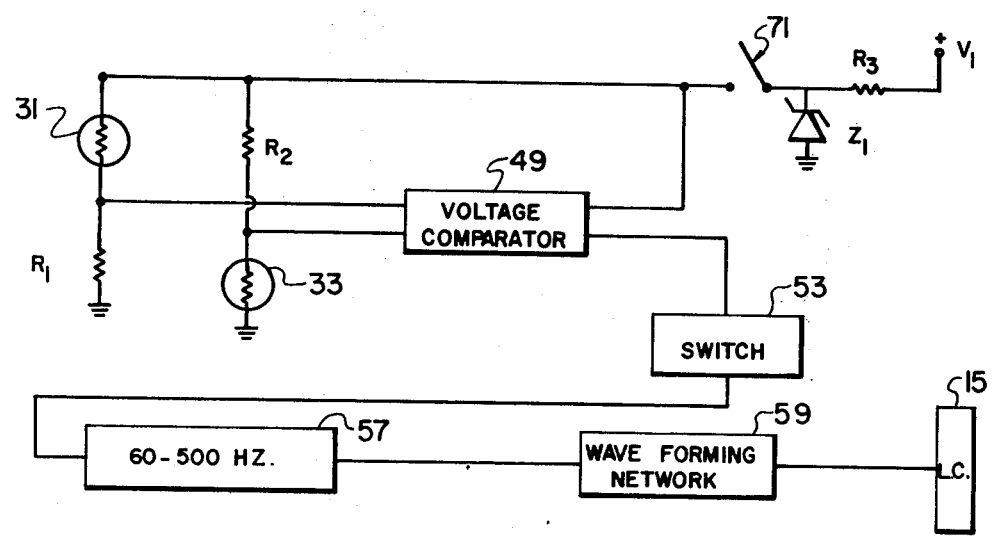
FIG. 4

FLIGHT TRAINING METHOD AND APPARATUS

This application is a continuation-in-part of a prior United States application, Ser. No. 659,906, filed Feb. 20, 1976, now U.S. Pat. No. 4,021,935 and entitled FLIGHT TRAINING HOOD.

BACKGROUND OF THE INVENTION

1. Field of the Invention

The invention relates to instrument flight method and apparatus for preventing an aircraft pilot from viewing outside his aircraft during instrument control flight instruction, and more particularly, to a pair of flight glasses which facilitates simulation of inflight vertigo.

2. Description of the Prior Art

In the area of inflight training, a student pilot must be trained to fly blind in bad weather. Pilots are required to have a minimum number of hours of flight instruction under simulated blind flying conditions before receiving a private or commercial license, or an instrument rating or military rating to fly aircraft. Such training is a necessity to pilots who plan to, or suddenly or inadvertently, fly into bad weather conditions.

Flight training hoods, goggles, glasses, and the like, have been designed to limit the wearer's field of view to only the instrument panel and immediate cockpit area. Such view limiting devices generally include elongated structures surrounding the pilot's line of vision for constriction thereof, blocking side and upper peripheral sight.

Some prior art flight hoods do not totally enclose or mask the wearer's line of vision in order to provide a safety factor which insures that the pilot can direct his vision outside the craft in the case of an emergency. However, to accomplish this factor, the hood's elongated structure extending in front of the operator's face becomes awkward and clumsy during flight and may cause eye straining or neck fatigue to support such apparatus. Also, the instructor must depend upon the wearer's trustworthiness during a testing and learning situation to purposefully keep his head substantially level so that the outside references are not in view.

Also, where the pilot inadvertently views outside of the aircraft, he would transition to VFR (visual flight rules) and must immediately transition back to IFR (instrument flight rules) as he looks back into the aircraft. This causes a disorientation to the pilot, promoting a time delay factor due to transition reorientation time. This psychological-type problem occurs with inadvertent viewing using the above-mentioned prior art devices.

Lens fogging-type devices have been considered in the flight hood art, but for the purpose of providing a visual contrast of a CRT display projected on the inside of a pilot's helmet, as described in an article of Rockwell International Corporation entitled "Variable-Transmittance Visor for Helmet-Mounted Display" by Dr. J. P. Dobbins. However, bi-state, lens fogging devices having a completely occluded vision state have not been considered nor utilized in the flight hood art because of a lack of mode of operation therein and because of the previously mentioned safety factor. Although such lens devices have been utilized in helmet-type gear, see for example U.S. Pat. No. 3,873,804 issued to M. Gordan on Mar. 25, 1974 and U.S. Pat. No. 3,409,909 issued to D. D. Scott et al on Nov. 12, 1968, the functioning of such devices are not compliant to the flight training hood art. Such devices are responsive to a bright flash of light that occurs during wearer viewing. However, in the flight training environment all stimuli including the ambient light in the cockpit are constant, having no apparent abrupt stimulus occurring at the time the desired fogging should take place.

Therefore, it would be highly desirable to provide flight training glasses having the ease and convenience of an unawkward structure including the quickness of an automatic lens system in which the lens would instantaneously operate in relation to the wearer's positioning of his line of vision.

SUMMARY OF THE INVENTION

It is therefore an object of this invention to provide a method for flight training in which the pilot is permitted to view the instrument control panel of his aircraft during flight and prevented from viewing outside of the craft as the pilot changes his vision away from the control panel.

It is a further object of this invention to provide flight training glasses having a bistable lens system operable to a state of transparency as the pilot views the instrument control panel of his aircraft and instantaneously operable to a state of vision occlusion responsive to the pilot switching his vision to outside of the aircraft.

It is further an object of this invention to provide maintenance of lens transparency in the case of emergency or necessary viewing for overriding the lens control system.

It is a further object of this invention to provide flight glasses in conformance to a planar lens configuration for instantaneously occluding the wearer's line of sight when the same is directed outside of the aircraft.

It is yet another object of this invention to provide flight training glasses operable to simulate an inflight vertigo condition by operation of the wearer.

The objectives of this invention are accomplished by using a pair of glasses having a bistable voltage controlled lens system disposed transverse to the line of wearer's vision being operable to a first state of transparency and a second state of opacity. The relative position of the lens system with respect to the windshield is monitored for switching states of the lens system to transparency when wearer is viewing the instrument control panel of his aircraft, and to instant opacity when the wearer is viewing outside of the aircraft. The glasses include a switching control for maintenance of the glasses in a state of transparency providing a safety factor and further for providing vertigo simulation upon landing approach by the wearer changing his line of sight outside of the aircraft to occlude his viewing, and thereafter manually switching the lens to its transparent state.

Other objects, features and advantages of the invention will be readily apparent from the following description of the preferred embodiment taken in conjunction with the appended claims, and accompanying drawings.

BRIEF DESCRIPTION OF THE DRAWINGS

FIG. 1 is an illustration of a pilot utilizing the flight training glasses of the present invention.

FIG. 2 is a partial perspective view of the flight training glasses of the present invention.

FIG. 3 is a front view of the flight glasses of the present invention.

FIG. 4 is a circuitry diagram of an embodiment of the present invention.

DESCRIPTION OF THE PREFERRED EMBODIMENT

Figure 5:
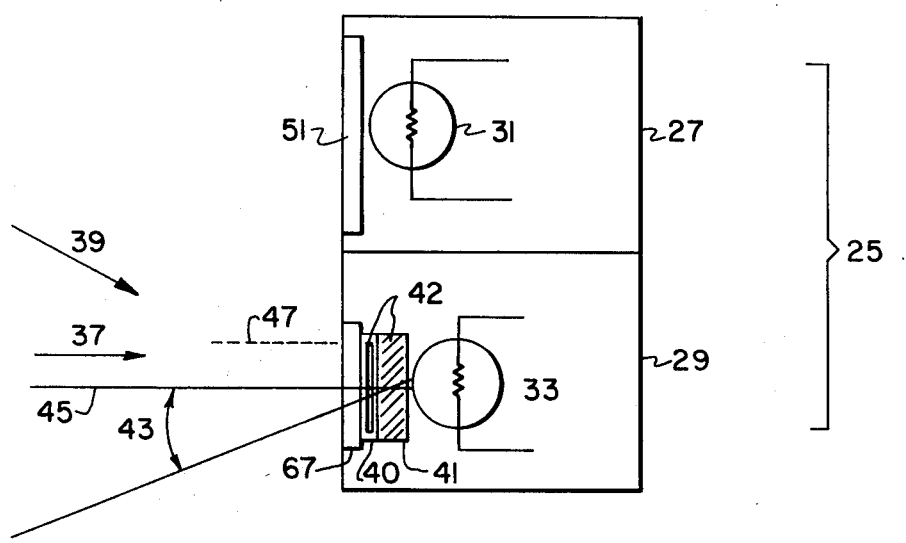
FIG. 5 is an enlarged view of the lens position indicating sensor of the flight glasses of the present invention.

As illustrated in FIG. 1, the preferred flight glasses embodiment of the present invention includes a pair of flight glasses 11 formed in the shape of a pair of regular eyeglasses. As shown in FIG. 3, the glasses 11 have a frontal piece 13 for housing a lens system comprising a pair of lenses 15 each formed from a liquid crystal and positioned for proper viewing therethrough by the wearer. The top portion 17 of each lens 15 is blackened by paint or by a voltage level, or otherwise for forming a horizontal boundary line 19 defining the top of the viewing area through the lenses 15. The portions 17 check the wearer's upper peripheral vision to a predetermined line of sight defined by the line 19, preventing the wearer from viewing higher without a corresponding upward movement of the wearer's head. The blackened portions 17 operate to discontinue upward eyeball rotation at a certain eyeball position and to engage movement of the operator's neck for further continuous upward eye searching.

The vision checking portions 17 may be integrally formed as a part of the frontal piece 13 and the lenses 15 formed only in the shape of the viewing area, rather than a blackening out of a portion of a larger lens. Other vision checking devices also may be utilized as will suggest themselves to persons skilled in the art, for performing the function of head rotation engagement for checking the wearer's upper peripheral vision without a corresponding head rotation.

As shown in FIG. 2, side supporting arms 21 are hinged or otherwise secured to the frontal piece 13 and shaped to extend back along the sides of the wearer's head and over the top of wearer's ears for holding the glasses into position during wearing. The glasses are to be held snugly against the wearer's nose in order to prevent the wearer from viewing out over the top of the glasses, and may be further molded to fit snugly if so desired.

Side blinders 23 depend from the support arm 21 along the outside of the wearer's eyes and are positioned for blocking the wearer's side peripheral vision. Each side blinder 23 may be formed from a liquid crystal to provide side vision occlusion and may be permitted to clear at other times when so desired.

The particular head gear configuration may take on other forms as may suggest themselves to those skilled in the art, in which a viewing lens is positioned transverse to the wearer's line of sight permitting a visual communication through the viewing lens. However, it should be appreciated that this particular embodiment of the invention provides original features and is particularly useful in the disclosed structure of a pair of lightweight eyeglasses.

A position sensor 25 (FIG. 3) operates for indicating the relative position of the flight glasses 11 with respect to the possible upper lines of sight of the wearer defined by the horizontal line 19. The position sensor 25 signals a switching system of FIG. 4 to actuate the lenses to their opaque state when the flight glasses are in a position to permit the operator to view outside the aircraft along his upper line of sight defined by the horizontal line 19.

A first embodiment of the position sensor 25 is shown enlarged in the view of FIG. 5 and includes an ambient light transducing system 27 and a directional light transducing system 29.

The light transducing system 27 includes a photocell 31 for monitoring the ambient light in the aircraft. As shown in FIG. 1, the ambient light intensity within the craft is substantially the light intensity coming from outside the aircraft into the cockpit as viewed by the pilot. This ambient light intensity will change according to cloud structures, the weather, the time of day, and the like.

The embodiment of the position sensor 25 of FIG. 5 is shown incorporated in the flight glasses of FIG. 3. The ambient light transducing system 27 is positioned between the two eye lenses on the face of the frontal piece 13 and stationed above the directional light transducing system 29. However, the ambient transducer 27 may be positioned at a different location on the glasses, or further, need not be positioned on the glasses at all, so long as the ambient light transducer 27 is in a position to sense the ambient light in the craft and transduce the sensed ambient light to a voltage level for use by the electrical circuitry of FIG. 4 as described hereinafter.

The directional light transducing system 29 is provided for sampling a separate area of space to monitor directional light coming therefrom. The system 29 is operatively located with respect to the horizontal line 19 for receiving directional light coming from an area of space lying just above the wearer's upper line of sight, or at an angle thereto where intersection takes place at or above the operator's vision extending just over the instrument panel 35, or if desired, substantially along the wearer's upper line of sight as determined by the horizontal line 19.

Thus, the directional light transducing system 29 monitors light coming from a selected direction, that selected direction being associated with a peripheral line of sight for indicating direction of the extent of possible peripheral viewing without a corresponding head movement for greater peripheral viewing. In the instant disclosure, concern is directed to upper peripheral viewing; however, a directional light transducer 50 may be placed for side peripheral view for indicating the direction of greatest side viewing by the operator without a corresponding side-turning of the wearer's head. And similarly, a lower peripheral view indicating system may also be established.

Thus, the checking portions 17 may be said to constrict the concerned peripheral-view-direction (in this case upper) to an easily determined line of sight (established by line 19) so as to properly locate the directional light monitoring of the transducer 29, and secondly, to constrict the peripheral viewing along this peripheral-view-direction to an extent such that the wearer can comfortably direct his vision to the instrument panel of his craft while having his upper peripheral vision checked to a point to prevent him from viewing out over the control panel without a corresponding upward movement of his head.

Referring to FIG. 5, the directional light transducer 29 operates to monitor intensities of light received from a selected direction (e.g. light direction 37) and will not monitor light coming from other directions (e.g. light direction 39). As disclosed in the prior parent application and incorporated herein by reference, a uniform passageway may be utilized to channel light to a photo transducer for restricting the reception of light by the photo transducer to a selected light direction, thus forming a directional light receiving transducer system.

However, the present embodiment utilizes a light control film 41, a product sold by the 3M Company and associated with 3M's Visual Products Division. The film 41 contains a plurality of microlouvers 42 positioned to work like a tiny venetian blind to control the viewing angle through the film. The film functions to channel light therethrough with respect to light directed within a certain angular range, generally referred to by the numeral 43. The angular range 43 is variable and the microlouvers may be otherwise constructed within the film to give a prescribed channeling of light as desired. The louvers may also be set at different angles with respect to the face of the film to rotate the position of the angular range 43 to vary the directions of light received within the angular range.

With respect to the preferred embodiment, the angular relationship of the louvers with respect to the face of the film are chosen such that the largest magnitude of directional light permitted to pass through the film is substantially 90 degrees, indicated by the reception line 45. The angular range 43 of permissible directions of receivable light is preferably kept small, here 18 degrees.

A second light control film 40, similar in construction to that of light control film 41, may be positioned in front of the control film 41 for further channeling of the entering light rays. The film 40 has its microlouvers 42 set orthogonal to the face of the film, and the film 40 is positioned in the sensor 29 such that the louvers run vertically with respect to the face of the film 41 to prevent side directed light from entering the film 41. Thus, the film 40 acts to constrict the directional light reception by the sensor 29 to light coming from the area directly in front of the wearer.

The films 40, 41 are positioned within the glasses 11 such that a directional line 47 orthogonal to one of the highest light passing points of the layer 41, lies in a cooperative relation with the wearer's upper line of sight as determined by the horizontal line 19 of the checking portions 17, so that as the operator rotates his head upwards the film 43 passes directional light related to the operator's upper line of sight for indicating whether the eyeglasses 11 are in a relative position to permit the wearer to view outside the craft along his upper line of sight.

Figure 6:
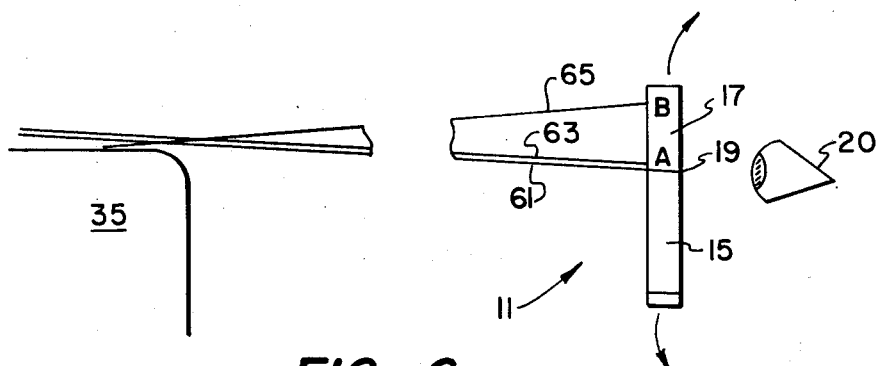
FIG. 6 is an illustration of the positional locations of the positioning sensor of the present invention.

FIG. 6 illustrates the placement of the directional transducer 29. The glasses 11 are shown in a position to permit the operator to view outside the aircraft along his highest upper line of sight 61 defined by the checking portions 17. It is when the glasses are in this position that the directional transducer must monitor a high light intensity coming from outside the craft. Thus, the transducer 29 may be set at position A for monitoring directional light coming along line 63 which may be located just above or along the operator's line of sight 61. Thus, directional receiving line 47 of FIG. 5 is positioned to substantially coincide with line 63 of FIG. 6, considering that along line 47 enough light is passed to photocell 33 to operate the circuitry of FIG. 4. Similarly, the transducer 29 may be set at position B for monitoring directional light coming along line 65 which is shown intersecting with the operator's line of sight 61 where intersection takes place at or above the operator's line of sight extending just over the instrument control panel 35. However, position B may vary depending upon the distance of the pilot's head from the panel 35 and therefore the preferable position of the transducer 29 is position A for monitoring directional light coming from just above or along the operator's upper line of sight and shall be referred to hereinafter for brevity and claim language as "substantially along a predetermined line of sight of the wearer"—predetermined by the checking portions 17.

As also shown in FIG. 6, the checking portions 17 are positioned with line 19 lying substantially horizontally in line with a level eyeball sight with respect to the operator's eye 20. This is the preferred position of line 19. However, the line 19 may be positioned somewhat higher or lower than a level eyeball line of sight, but the operator's upper line of sight as defined by the line 19 may vary a little depending upon the distance the glasses are positioned from the operator's eyes.

The photocell 33, as shown in FIG. 5, monitors the intensity of light passed by the film 41 for transducing the monitored light intensity to a corresponding voltage level, the magnitude of which is determined by the magnitude of the light intensities received. As long as the pilot's eyes are directed to the control panel of his aircraft, the light monitored by the directional transducer 29 will produce a relative low voltage output as compared to the light monitored by the ambient transducer 27. But as the pilot raises his head to such an extent that permits him to view out over the control panel, the ambient light from outside the craft is permitted to enter the film 41 along the directional line 47 causing an increase in the voltage output of the photocell 33 toward substantially the same voltage level as the output of photocell 31. The circuitry of FIG. 4 is utilized to monitor the voltage levels produced by the transducers 27, 29 to instantaneously operate the viewing lenses 15.

Figure 7:
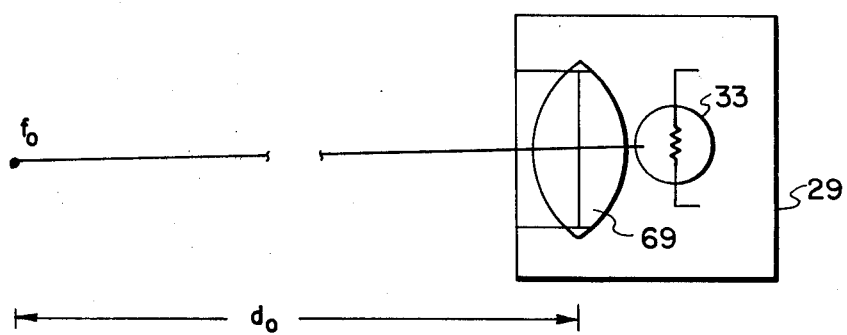
FIG. 7-10 are diagrammatic side views of other embodiments of the lens position sensor of the flight glasses of the present invention.

Referring to FIG. 7, a second embodiment of the directional trnasducing system 29 is shown as including a photocell 33 set to the backside of a lens member 69. The lens member 69 is formed for having a focal length $d_o$ which is greater than the distance to any portion of the inside of the cockpit while the operator is wearing the glasses 11, so that the lens 69 is only in focus when the pilot directs his line of vision outside the craft. The photocell 33 responds to the in-focus condition of the lens 69 and senses the ambient light coming from outside the craft. However, with the lens 69 out of focus, the photocell would "see" a blur of lower light intensity producing a lower output as compared to that of the ambient light intensity sensed when the lens is in focus. Thus, the output of the transducer 29 may be referenced against the output of ambient light transducing system 27 for actuation of the viewing lenses 15. Further, the focal length $d_o$ of the lens member 69 may be manually adjustable if so desired.

The directional transducing system 29 of FIGS. 5 and 7 may be used without the ambient light transducer 27 by utilizing switching circuitry which senses the voltage waveform output of the directional transducer system indicating a departure of the sensing of a low light intensity to a high light intensity, for example, circuitry using a fixed threshold as described in the above-referenced parent application.

The embodiment of FIG. 7 may further include a motion detector positioned behind the lens 69 for sensing motion of the aircraft propellor or the like directly out of the windshield. Because the focal length $d_o$ would be a distance greater than that within the cockpit, the motion detector would not detect relative motion as the wearer moved his head laterally across the control panel. Out of the side windows, struts and/or wing area would provide relative motion targets as the wearer moves his head with respect thereto. Also, differentials of color distinction, cloud formation, ground reference, etc., would provide relative movements outside the focal length area of the cockpit to actuate the motion detector.

Referring again to FIG. 3, the viewing lenses 15 are considered to form a voltage controlled, bistable lens system having a first stable state of transparency, and a second stable state of opacity. The individual eye lenses 15 are connected in parallel for identical operation.

Liquid crystals are well-known devices which may be used to instantaneously switch from a light transmissive state to a light obscuring state upon the application of a voltage. The liquid crystal lenses 15 are maintained in a transparent state until a voltage is applied thereto, whereby the lenses instantaneously change states providing opaqueness to the lens system preventing the pilot from seeing therethrough.

The control circuitry as shown in FIG. 4 operates the lens system for switching the states thereof according to a voltage output from the photocells 31, 33. The circuitry includes a voltage comparator 49 for comparing the voltage outputs of the photocells 31, 33. The photocell 31, as previously described, senses ambient light and operates as an automatically variable threshold reference level for establishing a required output necessary for the photocell 33 to actuate the lens system for instantly switching to its opaque state.

When the photocell 33 produces a voltage output substantially equal to the output of photocell 31, the comparator produces a voltage output to a switch 53. The switch 53 is operable upon a voltage output of comparator 49 for driving an oscillator 57 and waveforming network 59. Waveforming network 59 impresses the necessary voltage waveform onto the liquid crystal lenses 15 for actuation thereof, as understood by those familiar with liquid crystals.

As shown in FIG. 5, a thin piece of mylar 51 may be positioned in front of the ambient photocell 31 of the transducer 27 for lowering the intensity of light received by the photocell 31. Thus, the output of photocell 33 will go higher than the output of 31 as the wearer views outside the aircraft. Thus, the comparator may be set to output a voltage level to the switch 53 as the output waveform of photocell 33 crosses over the output waveform of photocell 31. As the voltage level of the photocell 33 decreases below that of photocell 31 the comparator extinguishes its voltage output to switch 53, switching off the oscillator 57.

Instead of using a light filter 51 for lowering the intensity of the photocell 31, the circuitry of FIG. 4 may utilize a voltage divider network to lower the voltage fed from the photocell 31 to the voltage comparator 49.

The invention, of course, is not limited to the electrical circuitry shown, rather than the electrical circuitry is one embodiment thereof; other circuitries may be utilized which are responsive to the magnitude of directional light received by the photocell 33 in conjunction with the ambient light sensed by photocell 31 for instantaneously actuating the liquid crystal lenses. For example, a voltage summing network may receive both outputs from the photocells 31, 33 for producing the sum of the two photocell outputs. This sum may then be compared with a reference level or even with twice the output of photocell 31 for actuation of switch 53.

The present embodiment has been described for daylight flying in which the ambient light coming from outside the craft will register a higher light intensity as compared to that monitored from the control panel by the directional light transducer 29. It should be understood, that the invention operates in night flying, also, where the instrument control panel puts off brighter light from the lighted instruments as compared to a lower light intensity coming from outside the craft. Thus, the circuitry of FIG. 4 is constructed for actuating the lens system 15 as the directional transducer 29 drops in monitored light intensity level toward the lower intensity level of the light coming from outside the craft.

Referring again to FIG. 5, a light color filter 67 may be positioned to cover the light control film 41 of the directional sensor 29. The color of the filter is chosen to correspond with the color of the control panel 35 in order to filter out any bright light being reflected off the control panel 35 and into the light control film 41.

As described above, the first and second embodiments of the directional transducing system 29 relate to light phenomenon. A third method for transducing the relative position of the upper peripheral line of sight into a voltage level for controlling lens state actuation includes a step of monitoring the temperature of either the instrument control panel or the aircraft windshield along the wearer's upper peripheral line of sight defined by the horizontal line 19.

Specifically, a temperature reading is taken along line 63 or line 65 (FIG. 6) sensing the temperature of either the instrument control panel or the aircraft windshield depending upon the relative position of the flight glasses 11. The windshield will be warmer than the control panel during the summer as a result of radiation from the sun, and during the winter the windshield will also be warmer than the control panel as a result of the defroster blowing hot air over the windshield. Thus, a temperature diferential will exist between the windshield and the control panel.

Noncontact temperature measuring devices are well known in their art in which temperatures of objects can be measured at a distance therefrom. The measured temperature may be converted to a voltage output indicative of the magnitude of the measured temperature; see for example U.S. Pat. No. 3,766,781 illustrating conversion of temperature to a voltage reading.

Figure 8:
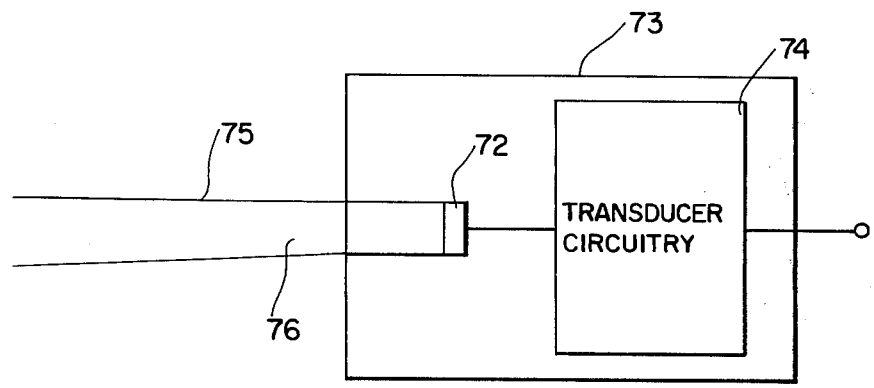

FIG. 8 illustrates a noncontact temperature measuring device 73, preferably of the infra-red, heat-seeking type, and is disposed on the flight glasses preferably at position A of FIG. 6. A photo-resistive device 72, sensitive to infra-red radiation, produces an output to a voltage transducer circuitry 74 for generating a voltage output of a magnitude related to the magnitude of temperature radiation sensed.

The input temperature radiation is channeled to a prescribed reception range 76 for making the device 73 directionally receptive in character. The radiation may be channeled by a microlouvered material of a substance capable of passing infra-red radiation similar to the control film 41 of FIG. 5, or by a channeling tube stucture similar to that disclosed in the above-referenced parent application, or otherwise as will suggest itself to one skilled in the art.

The upper directional receiving line 75 of the temperature sensor 73 is positioned to substantially coincide with line 63 of FIG. 6, considering that along line 75 enough infra-red radiation is passed to sensor 73 to indicate a temperature change.

A second temperature measurement may be taken directly from the windshield to provide a temperature reference to which the output reading of the noncontact temperature sensor 73 may be compared against. When the two temperature readings are substantially the same a switch similar to switch 53 of FIG. 4 may be actuated to impress the necessary voltage waveform across the lens system 15 to drive the same to its opaque state. The two temperature readings may be separately transduced to separate voltage levels indicative of temperature magnitude, and then fed to a voltage comparator similar to comparator 49 of FIG. 4.

The second temperature reading may also be taken from a noncontact temperature sensor positioned on the flight glasses 11 in a functional position similar to that of the ambient light transducer 27. And further, a fixed threshold level may be utilized in circuitry similar to that described in the above-referenced parent application for providing a voltage comparison with the transduced temperature reading of temperature sensor 73.

A fourth method for transducing the relative position of the upper peripheral line of sight into a voltage level for switching the lens system 15 includes the step of monitoring the sound level at the instrument control panel or at the aircraft windshield along the wearer's upper peripheral line of sight defined by horizontal line 19.

Specifically, a sound reading is taken along line 63 or line 65 (FIG. 6) for sensing the sound level at either the instrument control panel or at the aircraft windshield depending upon the relative position of the flight glasses 11. A sound differential exists between the sound level at the instrument control panel and the sound level at the aircraft windshield during aircraft operation. There is a definite decrease in noise level below the windshield.

Noncontact sound measuring devices are well-known in their art in which sound at an object can be measured at a distance therefrom. Also well-known are directional microphones which sense along a particular directional range. While any of the many types of directional microphones may be utilized to perform the method of the present invention, a regular microphone may be utilized in conjunction with a horn-type, channeling component for channeling the sound wave input to a particular directional range.

Figure 9:
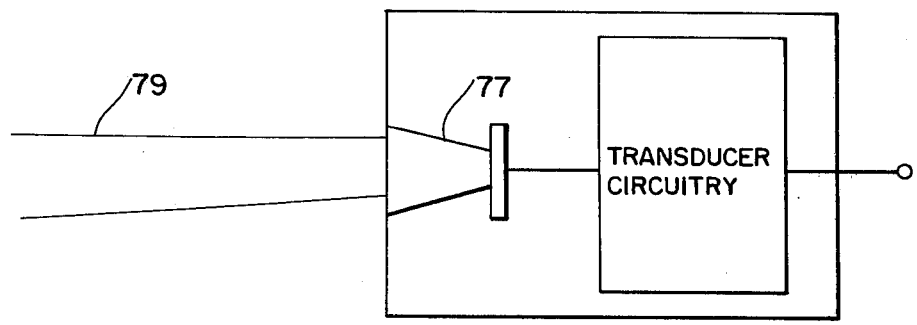

FIG. 9 illustrates diagrammatically, a directional microphone 77, which is disposed on the flight glasses preferably at position A of FIG. 6. The upper directional receiving line 79 of the microphone 77 is positioned to substantially coincide with line 63 (FIG. 6), considering that along line 79 enough sound radiation is passed to sensor 77 to indicate a sound change.

A second sound measurement may be taken from the aircraft windshield to provide a sound reference level for appropriate circuitry actuation by transduced voltage levels of sound in a manner similar to that described with respect to the directional light and directional temperature monitoring, and with a corresponding circuitry system similar to that of FIG. 4.

Rather than sensing a stimulus difference between natural stimulus occurring at the instrument control panel and natural stimulus occurring at the windshield as previously described, the present invention also contemplates generation of artificial stimulus at the windshield and/or control panel, and utilizing this stimulus differential for monitoring the relative position of the upper peripheral line of sight. The stimulus differential may include stimulus radiation occurring only at the windshield, or occurring only at the control panel, or occurring only at the interface between the windshield and control panel, or occurring at a combination of locations as will suggest itself to persons skilled in the art.

Figure 10:
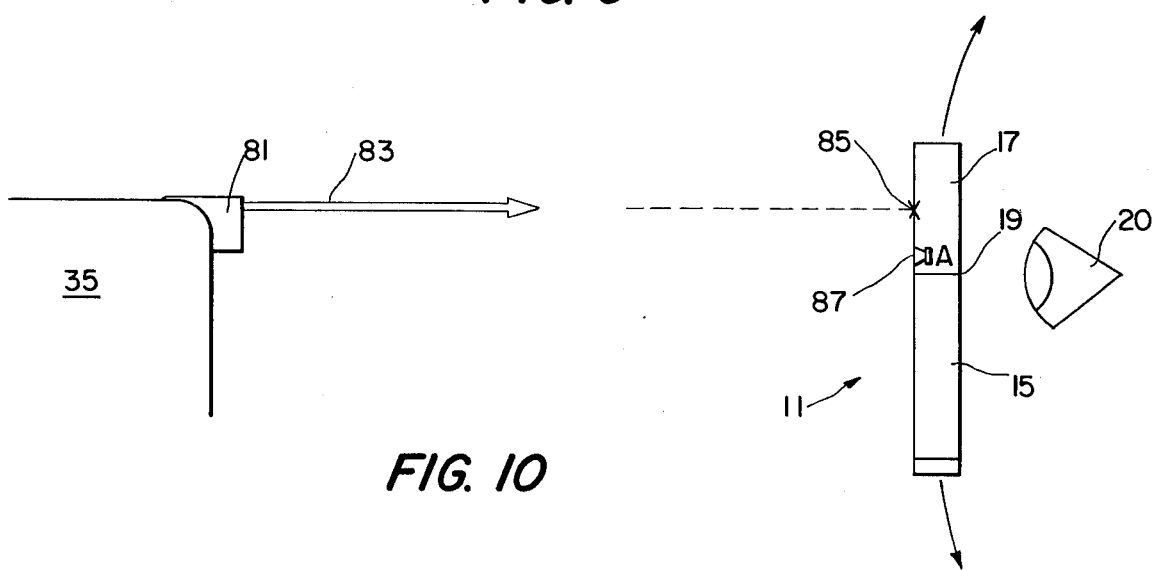

Referring to FIG. 10, a stimulus generator 81 is positioned on the instrument control 35 for generating a directional beam 83 of stimulus. The beam is preferably configured in the shape of a plane directed from the windshield/control panel interface and extending to the flight glasses 11 of the wearer. As shown in FIG. 10, the stimulus beam 83 intersects the flight glasses 11 at a point 85. As the wearer raised his head, the point of intersection 85 drops along the face of the glasses until point A is reached where a stimulus sensor 87 is positioned. The stimulus sensor 87 senses the beam 83 and produces a voltage output for switching the lens system 15 to its opaque state.

The sensor 87 is thus disposed on the eyeglasses 11 for sensing the beam 83 just prior to the glasses reaching a point to permit the wearer to view out over the control panel 35 along the wearer's upper peripheral line of sight.

The stimulus beam 83 could take the form, for example, of a light beam as used in "electric eye" systems. The light beam 83 would remain "broken" until the sensor 87 was moved into a position to receive the light beam.

Further, the stimulus beam 83 could take the form of an elecgromagnetic beam, e.g., an RF signal. The stimulus generator 81 would comprise a directional transmitter, and the stimulus sensor 87 would include an RF receiver. Only when the sensor 87 coincides with the intersection point 85 is the RF signal sensed.

Other stimulus generators would be obvious to persons skilled in the beam sensing art, including optical beams, laser beams, sonar beams, and other energy-type beams. Further, the stimulus generator may be adjustably mounted for initializing the radiational position of stimulus beam 83.

Appropriate circuitry would be utilized with the embodiment of FIG. 10, in which the sensor 87 would actuate a switch similar to switch 53 of FIG. 4 to impress a voltage waveform across the lens system 15. A sensing of the stimulus beam 83 by the sensor 87 would transduce the same to a voltage level for actuating the switch 53.

Referring again to FIG. 2, an ON-OFF switch 71 is disposed on the outside of the glasses 11 and is operatively coupled to the control circuitry of FIG. 4 to enable the wearer to manually set the lens system in its transparent state. The ON-OFF switch 71 may, for example, disconnect the photocell output from the liquid crystal lens 15 when in the OFF position, as shown in FIG. 4. The ON-OFF switch 71 provides a safety factor to override the system in case of an emergency or other necessary viewing, and also provides a necessary control for use of the flight hood of the present invention to simulate a flight vertigo condition in pilots.

Flight vertigo simulation is possible on landing approaches. With a state of deceleration and with the pilot viewing the control panel, the pilot changes his line of sight outside of the aircraft to fog the lens occluding his viewing. Shortly thereafter, the pilot manually switches the ON-OFF switch to its OFF position setting the lens to its transparent state. The pilot immediately experiences vertigo.

It should be understood, of course, that the foregoing disclosure relates to preferred embodiments of the invention and that other modifications or alterations may be made therein without departing from the spirit or scope of the invention as set forth in the appended claims.

What is claimed is:

1. A method of limiting the vision of a pilot to the instrument control panel of his aircraft using lens means switchable to a first state of transparency permitting visual communication therethrough for permitting the pilot to view the control panel of the aircraft and switchable to a second state of opacity for obscuring visual communication when the pilot's head is in a position to permit viewing outside the aircraft, comprising the steps of:
   positioning said lens means in a transverse relationship with respect to the line of sight of a pilot;
   checking the pilot's vision through said lens means with respect to a peripheral-view-direction to a predetermined line of sight to engage movement of the pilot's head for a greater peripheral viewing along said peripheral-view-direction;
   monitoring the light intensity of directional light coming substantially along said predetermined line of sight;
   monitoring the ambient light intensity coming from outside the aircraft;
   relating said monitored light intensity of directional light to the monitored ambient light intensity coming from outside the aircraft, said relating including determining whether said lens means is in a position to permit the pilot to view outside the craft; and
   switching said lens means to said first or second state responsive to said determining.

2. A method according to claim 1 and further including the steps of: transducing said monitored light intensity of directional light to a first voltage level; and transducing said monitored ambient light intensity to a second voltage level; and wherein said step of relating said monitored light intensity of directional light to the monitored ambient light intensity includes relating said first and said second voltage levels.

3. A method according to claim 1 wherein said step of monitoring the light intensity of directional light includes transducing ambient light to directional light.

4. A method of limiting the vision of a pilot to the instrument control panel of his aircraft using lens means switchable to a first state of transparency permitting visual communication therethrough for permitting the pilot to view the control panel of the aircraft and switchable to a second state of opacity for obscuring visual communication when the pilot's head is in a position to permit viewing outside the aircraft, comprising the steps of:
   positioning said lens means in a transverse relationship with respect to the line of sight of a pilot;
   checking the pilot's vision through said lens means with respect to a peripheral-view-direction to a predetermined line of sight to engage movement of the pilot's head for a greater peripheral viewing along said peripheral-view-direction;
   monitoring the light intensity of directional light coming along a directional line associated with said predetermined line of sight which directional line intersects said predetermined line of sight at or above the control panel when said predetermined line of sight is extending just over the instrument control panel;
   monitoring the ambient light intensity coming from outside the aircraft;
   relating said monitored light intensity of directional light to the monitored ambient light intensity coming from outside the aircraft, said relating including determining whether said lens means is in a position to permit the pilot to view outside the craft; and
   switching said lens means to said first or second state responsive to said determining.

5. A method of limiting the vision of a pilot to the instrument control panel of his aircraft using a lens means switchable to a first state of transparency permitting visual communication therethrough for permitting the pilot to view the control panel of the aircraft and switchable to a second state of opacity for blocking visual communication when the pilot's head is in a position to permit viewing outside the aircraft through the windshield, comrpising the steps of:
   positioning said lens means in a transverse relationship with respect to the line of sight of a pilot;
   checking the pilot's vision through said lens means with respect to a peripheral-view-direction to a predetermined line of sight to engage movement of the pilot's head for a greater peripheral viewing along said peripheral-view-direction;
   monitoring the relative position of said predetermined line of sight with respect to the instrument control panel and the windshield, said monitoring including indicating when said predetermined line of sight passes through said windshield; and
   switching said lens means to said first or second state responsive to said monitoring.

6. A method according to claim 5 wherein a temperature differential exists between the control panel and the aircraft windshield, and wherein said step of monitoring the relative position of said predetermined line of sight includes: monitoring temperature radiation along said predetermined line of sight; and determining whether said predetermined line of sight passes through the windshield responsive to the magnitude of monitored temperature radiation.

7. A method according to claim 6 wherein said step of monitoring the relative position of said predetermined line of sight includes monitoring the temperature of the windshield; and comparing said monitored temperature radiation with the monitored temperature of the windshield.

8. A method according to claim 5 wherein a sound differential exists between the sound level at the control panel and the sound level at the aircraft windshield and wherein said step of monitoring the relative position of said predetermined line of sight includes: monitoring sound radiation along said predetermined line of sight; and determining whether said predetermined line of sight passes through the windshield responsive to the magnitude of monitored sound radiation.

9. A method according to claim 8 wherein said step of monitoring the relative position of said predetermined line of sight includes monitoring the sound level at the windshield; and comparing said monitored sound radiation with the monitored sound level at the windshield.

10. A method according to claim 5 and wherein said step of monitoring the relative position of said predetermined line of sight includes:
generating stimulus radiation at the interface of the control panel and the windshield;
monitoring for generated stimulus radiation along said predetermined line of sight; and
determining whether said predetermined line of sight passes through said interface responsive to said step of monitoring for generated stimulus.

11. A method according to claim 5 and wherein said step of monitoring the relative position of said predetermined line of sight includes:
generating stimulus radiation, said generating providing a magnitude of stimulus differential between the stimulus level at the control panel and the stimulus level at the aircraft windshield;
monitoring generated stimulus radiation along said predetermined line of sight; and
determining whether said predetermined line of sight passes through said windshield responsive to the magnitude of monitored stimulus radiation.

12. Flight training apparatus for limiting the vision of a pilot to the instrument control panel of his aircraft, comprising:
voltage controlled lens means having a first state of transparency permitting the wearer to visually communicate therethrough, and operable to a second state of opacity for blocking visual communication;
means for suitably securing said lens means in a transverse relationship with respect to the line of sight of a pilot;
vision checking means for checking the pilot's vision through said lens means with respect to a peripheral-view-direction to a predetermined line of sight to engage movement of the pilot's head for a greater peripheral viewing along said perhipheral-view-direction;
directional light receiving transducer means operatively associated with the movement of said hood means, for monitoring the light intensity of directional light coming substantially along said predetermined line of sight;
ambient light transducing means for monitoring ambient light intensity associated with the ambient light intensity coming from outside the aircraft; and
electrical circuitry means cooperable with said directional light receiving transducer means and said ambient light transducing means, said circuitry means actuating said lens means to said second state responsive to a light intensity monitored by said directional light receiving means substantially equal to said light intensity monitored by said said ambient light transducing means, said lens means remaining in said first state with light intensities monitored by said directional light receiving means substantially different than said light intensity monitored by said ambient light transducing means.

13. Apparatus according to claim 12 wherein said directional light receiving transducer means includes a light intensity transducer means; and means for channeling light to said light intensity transducer means, for restricting the reception of light by said light intensity transducer means to directional light.

14. Apparatus according to claim 13 wherein said light channeling means includes a plurality of louvers.

15. Apparatus according to claim 14 wherein said louvers are microlouvers disposed in a transparent film.

16. Flight training apparatus for limiting the vision of a pilot to the instrument control panel of his aircraft, comprising:
voltage controlled lens means having a first state of transparency permitting the wearer to visually communicate therethrough, and operable to a second state of opacity for blocking visual communication;
means for suitably securing said lens means in a transverse relationship with respect to the line of sight of a pilot;
vision checking means for checking the pilot's vision through said lens means with respect to a peripheral-view-direction to a predetermined line of sight to engage movement of the pilot's head for a greater peripheral viewing along said peripheral-view-direction;
light transducer means operatively associated with the movement of said hood means, said transducer means including an optical focal lens system having a focal length of magnitude such that said focal lens system passing different light intensities when directed to the instrument control panel of the aircraft as compared to directed outside the crfat when the pilot is wearing the flight training apparatus within the aircraft, said focal lens system positioned for receiving light radiation substantially along said predetermined line of sight; and
electrical circuitry means cooperable with said light transducer means for discriminating between said different light intensities, said circuitry means actuating said lens means to said second state responsive to a passed light intensity corresponded to said optical lens system directed outside the aircraft, and said lens means remaining in said first state with passed light intensities corresponded to said optical lens system directed to the instrument control panel of the aircraft.

17. Flight training apparatus for preventing the pilot from viewing out through the windshield of his aircraft, comprising:
voltage controlled lens means having a first state of transparency permitting the wearer to visually communicate therethrough, and operable to a second state of opacity for locking visual communication;
means for suitably securing said lens means in a transverse relationship with respect to the line of sight of a pilot;
vision checking means for checking the pilot's vision through said lens means with respect to a peripheral-view-direction to a predetermined line of sight to engage movement of the pilot's head for a greater peripheral viewing along said peripheral-view-direction;
means for monitoring the relative position of said predetermined line of sight with respect to the windshield, said means indicating when said predetermined line of sight passes through said windshield, said monitoring means includes means for producing a voltage level indicating said predetermined line of sight passing through said windshield; and electrical circuitry means cooperable with said monitoring means for actuating said lens means to said second state responsive to said production of said voltage level indicating said predetermined line of sight passing through said windshield, said lens means otherwise remaining in said first state.

18. Flight training apparatus according to claim 17 and further including manual switching means for maintaining said lens means in said transparent state and overriding any attempted actuation of said lens means by said monitoring means.

* * * * *